(12) United States Patent
Suk

(10) Patent No.: US 11,941,644 B2
(45) Date of Patent: Mar. 26, 2024

(54) METHOD OF PROVIDING REAL ASSET AUTHENTICATION SERVICE USING DECENTRALIZED IDENTIFIER AND NON-FUNGIBLE TOKEN

(71) Applicant: In-Soo Suk, Seoul (KR)

(72) Inventor: In-Soo Suk, Seoul (KR)

( * ) Notice: Subject to any disclaimer, the term of this patent is extended or adjusted under 35 U.S.C. 154(b) by 177 days.

(21) Appl. No.: 17/979,953

(22) Filed: Nov. 3, 2022

(65) Prior Publication Data

US 2023/0145439 A1    May 11, 2023

(30) Foreign Application Priority Data

Nov. 5, 2021  (KR) .................. 10-2021-0151677

(51) Int. Cl.
 *G06Q 30/018* (2023.01)
 *G06Q 20/38* (2012.01)
 *H04L 9/40* (2022.01)

(52) U.S. Cl.
 CPC ....... *G06Q 30/0185* (2013.01); *G06Q 20/389* (2013.01); *H04L 63/083* (2013.01)

(58) Field of Classification Search
 CPC . G06Q 30/0185; G06Q 20/389; H04L 63/083
 See application file for complete search history.

(56) References Cited

U.S. PATENT DOCUMENTS

2020/0117690 A1\* 4/2020 Tran .................. G06F 16/90332
2021/0081940 A1\* 3/2021 Withrow ............ G06Q 30/0185
(Continued)

FOREIGN PATENT DOCUMENTS

KR  10-2014-0038205 A    3/2014
KR      10-2120051 B1    6/2020
(Continued)

OTHER PUBLICATIONS

Bobby Singh, "NFT Platform and Marketplace with Deflationary Cryptocurrency", Sep. 2021. Available at: https://luxuryledger.io/dist/pdf/Luxury%20Ledger%20Whitepaper%202021.pdf (Year: 2021).\*
(Continued)

*Primary Examiner* — Gregory Harper
(74) *Attorney, Agent, or Firm* — Sughrue Mion, PLLC

(57) ABSTRACT

Provided is a method of providing an authentication service using a decentralized identifier (DID) and a non-fungible token (NFT) which includes storing, in an authentication information database, authentication information, packing the authentication information in the NFT and then registering the NFT authentication information in a block chain, transmitting the NFT to a user terminal, comparing, by a purchaser terminal who intends to purchase the NFT, the NFT uploaded from the user terminal with the NFT registered in the block chain and then transmitting the result to the purchaser terminal, and allowing the purchaser terminal to photograph the surface fingerprint of the product when the purchaser terminal receives the product which is the real asset certified with the NFT and authenticating that the product is an original when the surface fingerprint packed in the NFT registered in the block chain matches the surface fingerprint photographed by the purchaser terminal.

9 Claims, 6 Drawing Sheets

(56) References Cited

U.S. PATENT DOCUMENTS

| | | | |
|---|---|---|---|
| 2021/0256070 A1* | 8/2021 | Tran ................. | G06F 16/90332 |
| 2021/0406920 A1* | 12/2021 | McLaney ............... | G06Q 20/02 |
| 2022/0040557 A1* | 2/2022 | Tran ....................... | G06F 1/163 |
| 2022/0329446 A1* | 10/2022 | Jackson ................ | H04L 9/3247 |
| 2022/0345316 A1* | 10/2022 | Testagrossa .......... | H04L 9/3247 |
| 2023/0045071 A1* | 2/2023 | Kalaldeh .............. | G06Q 30/018 |
| 2023/0062427 A1* | 3/2023 | Shapshal ............ | G06K 19/0614 |
| 2023/0070389 A1* | 3/2023 | Madhusudhan ..... | G06Q 10/083 |
| 2023/0073859 A1* | 3/2023 | Matthews .......... | G06Q 30/0185 |
| 2023/0092012 A1* | 3/2023 | Matthews .......... | G06Q 20/0658 |
| 2023/0104103 A1* | 4/2023 | Eby ................. | G06Q 20/38215 |
| | | | 705/69 |
| 2023/0118312 A1* | 4/2023 | Sun ..................... | G06Q 20/389 |
| | | | 705/69 |

FOREIGN PATENT DOCUMENTS

| | | | | |
|---|---|---|---|---|
| KR | 10-2020-0092194 A | 8/2020 | | |
| KR | 10-2199567 B1 | 1/2021 | | |
| KR | 10-2021-0057268 A | 5/2021 | | |
| WO | WO-2014069793 A1 * | 5/2014 | ............ | G06Q 10/08 |
| WO | WO-2021159097 A1 * | 8/2021 | ........... | G06F 21/602 |

OTHER PUBLICATIONS

Request for the submission of an opinion for KR 10-2021-0151677 dated Apr. 6, 2022.

Written decision on registration for KR 10-2021-0151677 dated Jun. 13, 2022.

\* cited by examiner

METHOD OF PROVIDING REAL ASSET AUTHENTICATION SERVICE USING DECENTRALIZED IDENTIFIER AND NON-FUNGIBLE TOKEN

CROSS-REFERENCE TO RELATED APPLICATION

This application claims priority to and the benefit of Korean Patent Application No. 10-2021-0151677 filed on Nov. 5, 2021, the disclosure of which is incorporated herein by reference in its entirety.

BACKGROUND

1. Field of the Invention

The present invention relates to a method of providing a real asset authentication service using a decentralized identifier (DID) and a non-fungible token (NFT) and provides a method of maintaining validity, identity, integrity, and continuity by authenticating a surface fingerprint with DID during NFT transactions of real assets.

2. Discussion of Related Art

Non-fungible tokens (NFTs) refer to block chain tokens with non-fungible information. The NFTs use block chain encryption technology to give separate unique identification information to digital files such as pictures, videos, and music, and unlike fungible tokens, since each token has its own unique characteristics because a unique identifier is included in information contained in a block and data is included in an underlying asset, each token has its own unique characteristics. Non-fungible attributes of the NFTs may prove originality, authenticity, and uniqueness of digital files, prove a collection and purchase history, and give a value of rarity. The NFT is block chain technology, and serves as a digital token capable of guaranteeing ownership by inputting unique recognition values, such as purchaser information, to a computer file or as a digital proof of the original or proof of ownership capable of recording and transacting artwork.

In this case, methods of using block chain-based NFTs when transacting artwork or using physical characteristics to check whether the artwork is forged or counterfeited are being studied and developed. In this regard, Korean Patent No. 10-2199567 (published on Jan. 7, 2021) and Korean Patent No. 10-2120051 (published on Jun. 17, 2020) as related art disclose a configuration of acquiring ownership information based on NFTs, including lot information, upon completion of verification when requesting authentication and verification of the lot information including artwork information and artwork transaction data in possession and transmitting the NFTs based on a block chain upon transacting and transferring the NFTs, and a configuration of managing authentication information, in which physical characteristic information and unique information appearing on a surface of a product are combined into one based on a block chain, and confirming the original based on whether original authentication information stored in the block chain matches physical characteristic information confirmed by a purchaser, respectively.

However, in the case of the former configuration, even if artwork is authenticated and verified by an expert and transacted with NFTs, the configuration may not prevent malicious purchasers from making a counterfeit or reselling a forgery as artwork. The latter configuration confirms unique characteristics of a product through a block chain, but does not apply block chain technology to verify the unique characteristics of the product or transact the product. In order to transact real assets such as works or real-art with NFTs, it is necessary to first verify whether there are real assets certified with the NFT. There is a need to maintain originality, integrity, and continuity of storage by a process of confirming whether the real assets are counterfeited or forged and a process of confirming whether the real assets are forged or tampered on the way and finally confirming, by a customer as a recipient, once again whether the real assets are genuine. Accordingly, research and development of a platform capable of confirming the presence or absence of real assets, whether the real assets are forged or tampered with, and whether integrity is secured through continuity of management when transacting the real assets, not digital assets, with NFTs is required.

SUMMARY OF THE INVENTION

The present disclosure provides a system for providing a real asset authentication service using a decentralized identifier (DID) and a non-fungible token (NFT) capable of creating an NFT by determining that a real asset is genuine from a certified authority, and then, packing authentication data including a unique identification code and a surface fingerprint, which is a physical characteristic on a surface of the real asset, in the NFT when the real asset is transacted with the NFT, and displaying authentication of a genuine product when the surface fingerprint in the NFT is compared with and matches the received physical characteristics of the real asset based on the DID after transaction parties receive the real asset while receiving the NFT in the case where the transaction between the transaction parties is performed through the NFT after the NFT is registered in the block chain. However, the technical problems to be achieved by embodiments of the present disclosure are not limited to the technical problems as described above, and other technical problems may be present.

The present disclosure may provide a method of providing an authentication service using a DID and an NFT, including: storing, in an authentication information database, authentication information including a unique identification code of a product and a surface fingerprint according to surface characteristics of the product based on genuine information when authenticity of the product, which is a real asset, is determined by at least one certified authority server, packing the authentication information stored in the authentication information database in the NFT, and then registering the NFT authentication information in a block chain, transmitting the NFT to a user terminal of a user who is an owner of the product, uploading the NFT from the user terminal to an NFT transaction platform, comparing, by a purchaser terminal who intends to purchase the NFT, the NFT uploaded from the user terminal with the NFT registered in the block chain and then transmitting the result to the purchaser terminal, and allowing the purchaser terminal to photograph the surface fingerprint of the product when the purchaser terminal receives the product which is the real asset certified with the NFT and authenticating that the product is an original when the surface fingerprint packed in the NFT registered in the block chain matches the surface fingerprint photographed by the purchaser terminal.

DETAILED DESCRIPTION OF EXEMPLARY EMBODIMENTS

Figure 1:
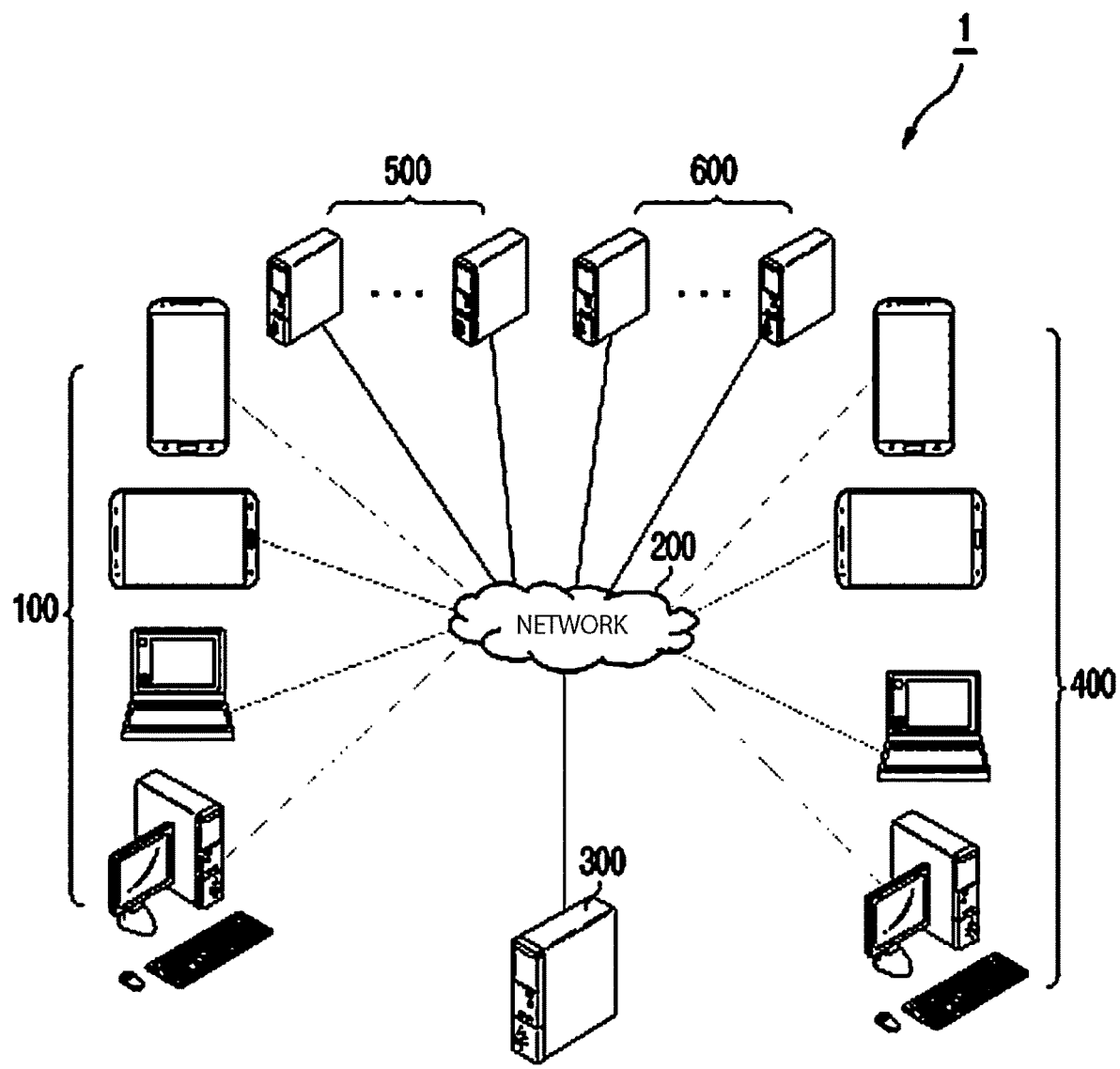
FIG. 1 is a diagram for describing a system for providing a real asset authentication service using a decentralized identifier (DID) and a non-fungible token (NFT) according to an embodiment of the present invention.
Figure 1:
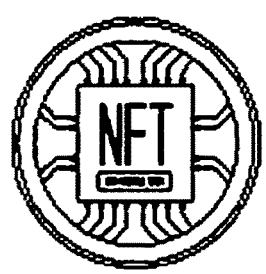
Figure 1:
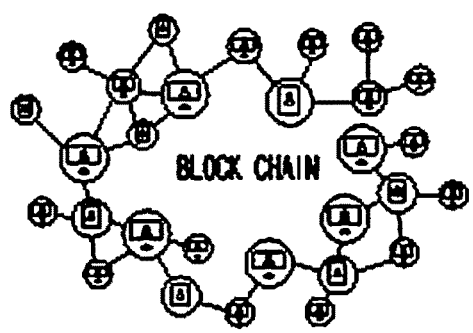

Hereinafter, embodiments of the present disclosure will be described in detail with reference to the accompanying drawings so that those skilled in the art to which the present disclosure pertains may easily practice the present invention. However, the present invention may be implemented in various different forms, and is not limited to embodiments described herein. In addition, in the drawings, portions unrelated to the description will be omitted to clearly describe the present disclosure, and similar portions will be denoted by similar reference numerals throughout the specification.

Throughout the present specification, when any one part is referred to as being "connected to" another part, it means that any one part and another part are "directly connected to" each other or are "electrically connected to" each other with still another part interposed therebetween. Also, when a certain part "includes" a certain component, it means that other components may be further included, rather than excluding other components, unless otherwise stated, and it should be understood that it does not preclude the possibility of addition or presence of one or more other features, numbers, steps, operations, elements, parts, or combinations thereof.

The terms "about," "substantially," and the like used throughout the present specification means figures corresponding to manufacturing and material tolerances specific to the stated meaning and figures close thereto, and are used to prevent unconscionable abusers from unfairly using the disclosure of figures precisely or absolutely described to aid the understanding of the present disclosure. The term "~step" or "~step of" used throughout the present specification of the present invention does not mean "~step for."

In the present specification, the term "unit" includes a unit implemented by hardware, a unit implemented by software, and a unit implemented by both the hardware and software. Further, one unit may be implemented by two or more pieces of hardware, and two or more units may be implemented by one piece of hardware. However, "~unit" is not limited to software or hardware, and may be configured to reside in an addressable storage medium or configured to reproduce one or more processors. Therefore, as an example, the "~ unit" includes components such as software components, object-oriented software components, class components and task components, processes, functions, attributes, procedures, subroutines, segments of program code, drivers, firmware, microcode, circuits, data, databases, data structures, tables, arrays, and variables. Components and functions provided in "~ units" may be combined into a smaller number of components and '~ units' or may be separated into additional components and "~ units." Furthermore, components and "~ units" may be implemented to reproduce one or more central processing units (CPUs) in a device or a security multimedia card.

In the present specification, some of the operations or functions described as performed by a terminal, an apparatus, or a device may be performed instead in a server connected to the corresponding terminal, apparatus, or device. Similarly, some of the operations or functions described as being performed by a server may be performed in a terminal, an apparatus, or a device connected to the corresponding server.

In the present specification, some of operations or functions described as mapping with or matching a terminal means mapping or matching a unique number of the terminal or personal identification information, which is identification data of the terminal.

In the present specification, a surface fingerprint may be a mark, a pattern, or the like that is intrinsically uniquely generated in a surface of a product, but may be an artificially produced mark, pattern, or the like. In the present invention, the "artificially generated fingerprint" is implemented as a combination of various patterns as a combination of various patterns (any patterns identified in an a surface fingerprint such as comb pattern, polka dot pattern, crater pattern, mesh pattern, wave pattern, non-woven pattern, sandpaper pattern, stripes, cloud pattern, wave pattern, sand pattern, swirl pattern, bead pattern and block pattern, etc.), letters, numbers, signs, and the like by utilizing any one image processing technology of a flat image, a three-dimensional image, a perspective (x-ray) image, and a holographic image.

Hereinafter, the present disclosure will be described in detail with reference to the accompanying drawings.

FIG. 1 is a diagram for describing a system for providing a real asset authentication service using a decentralized identifier (DID) and a non-fungible token (NFT) according to an embodiment of the present invention. Referring to FIG. 1, a system 1 for providing a real asset authentication service using a DID and an NFT may include at least one user terminal 100, an authentication service providing server 300, at least one purchaser terminal 400, at least one certified authority server 500, and an authentication management company server 600. However, since the system 1 for providing a real asset authentication service using a DID and NFT of FIG. 1 is only an embodiment of the present invention, the present invention is not limitedly interpreted through FIG. 1.

In the present invention, a "real asset" is defined as a concept including a general real asset as well as an image of a real thing and/or an immaterial object. In addition, the "surface fingerprint" may be unique surface characteristics of a real thing itself, a surface fingerprint of a general real thing may be unique surface characteristics on a surface of the real thing, and the surface fingerprint of the image real may be a mark of an artificially generated unique fingerprint pattern.

In this case, each component of FIG. 1 is generally connected through a network 200. For example, as illustrated in FIG. 1, at least one user terminal 100 may be connected to the authentication service providing server 300 through a network 200. In addition, the authentication service providing server 300 may be connected to at least one user terminal 100, at least one purchaser terminal 400, at least one certified authority server 500, and the authentication management company server 600 through the network 200. In addition, at least one purchaser terminal 400 may be connected to the authentication service providing server 300 through the network 200. In addition, the at least one certified authority server 500 may be connected to at least one user terminal 100, the authentication service providing server 300, and at least one purchaser terminal 400 through the network 200. Finally, the authentication management company server 600 may be connected to the user terminal 100, the purchaser terminal 400, the authentication service providing server 300, and at least one certified authority server 500 through the network 200.

Here, the network refers to a connection structure in which information exchange is possible between respective nodes, such as a plurality of terminals and servers, and an example of such a network includes a local area network (LAN), a wide area network (WAN), the Internet (World Wide Web (WWW)), wired and wireless data communication networks, telephone networks, wired and wireless television networks, and the like. Examples of the wireless data communication network include 3G, 4G, 5G, $3^{rd}$ Generation Partnership Project (3GPP), $5^{th}$ Generation Partnership Project (5GPP), long term evolution (LTE), world interoperability for microwave access (WiMAX), Wi-Fi, Internet, a local area network (LAN), a wireless local area network (WLAN), a wide area network (WAN), a personal area network (PAN), radio frequency, a Bluetooth network, a near-field communication (NFC) network, a satellite broadcast network, an analog broadcast network, a digital multimedia broadcasting (DMB) network, and the like, but are not limited thereto.

In the following, the term at least one is defined as a term including the singular and plural, and even if the term at least one is not present, each component may be present in singular or plural, and it will be obvious that it may mean singular or plural. In addition, the fact that each component is provided in singular or plural can be changed according to embodiments.

The at least one user terminal 100 may be a user terminal that uses a web page, an app page, a program, or an application related to a real asset authentication service using a DID and NFT to authenticate the genuineness of a product, receives an issuance of the NFT, and then uploads the NFT to an NFT transaction platform to sell the uploaded NFT.

Here, the at least one user terminal 100 may be implemented as a computer capable of accessing a server or a terminal at a remote location through a network. Here, the computer may include, for example, navigation, a notebook equipped with a web browser, a desktop, a laptop, and the like. In this case, the at least one user terminal 100 may be implemented as a terminal capable of accessing a server or a terminal at a remote location through a network. The at least one user terminal 100 is a mobile communication device in which portability and mobility are guaranteed, and examples thereof may include all types of handheld-based wireless communication devices such as a personal communication system (PCS), global system for mobile communication (GSM), personal digital cellular (PDC), a personal handyphone system (PHS), a personal digital assistant (PDA), international mobile telecommunication (IMT)-2000, code division multiple access (CDMA)-2000, W-code division multiple access (W-CDMA), a wireless broadband Internet (WiBro) terminal, a smart phone, a smart pad, a tablet PC, and the like.

The authentication service providing server 300 may be a server that provides a web page, an app page, a program, or an application related to a real asset authentication service using a DID and NFT. In addition, the authentication service providing server 300 may be a server that receives a request to authenticate a genuine product (authentic product) of a product from the user terminal 100, confirms whether a product is genuine from at least one certified authority server 500, packs authentication information in an NFT in the authentication management company server 600 and issues the NFT later to enable DID authentication, and registers the issued NFT in the block chain along with a public key. In addition, after the issued NFT is uploaded to the NFT transaction platform in the user terminal 100 for a transaction, when the purchaser terminal 400 confirms a genuine product, the authentication service providing server 300 may be a server that compares the surface fingerprint in the NFT stored in the block chain with the surface fingerprint in the NFT uploaded to the NFT transaction platform, and transmits whether the surface fingerprints match each other to the purchaser terminal 400. In addition, the authentication service providing server 300 may be a server that allows the purchaser terminal 400 to connect a photographing device when delivery is complete after making a purchase from the purchaser terminal 400, confirms the surface fingerprint as the surface characteristics of the product photographed by a photographing device and the surface fingerprint in the NFT in the block chain, and confirms whether the product is genuine. In this case, the photographing device may be a microscope, a portable X-ray machine, a hologram camera, or the like. In addition, the authentication service providing server 300 may be a server that transmits an abnormal authentication event to the purchaser terminal 400 when genuine product verification for the same product occurs sporadically or when the genuine product verification occurs at different locations within a time difference other than a speed at which a person can move. In addition, in the case of storing the history log leading to producer-distribution-logistics-distributor-consumer, as well as in the case where consumers resell products whose intellectual property rights have been exhausted by a theory of exhaustion of rights, the authentication service providing server 300 may be a server that allows a genuine chain to be built by continuously managing the history log.

Here, the authentication service providing server 300 may be implemented as a computer capable of accessing a remote server or terminal through a network. Here, the computer may include, for example, navigation, a notebook equipped with a web browser, a desktop, a laptop, and the like.

The at least one purchaser terminal 400 may be a purchaser terminal that purchases an NFT using a web page, an app page, a program, or an application related to a real asset authentication service using a DID and NFT, receives a real asset, that is, a product certified with the NFT, and then compares surface fingerprints to confirm whether the product is counterfeit.

Here, the at least one purchaser terminal 400 may be implemented as a computer capable of accessing a server or a terminal at a remote location through a network. Here, the computer may include, for example, navigation, a notebook equipped with a web browser, a desktop, a laptop, and the like. In this case, the at least one purchaser terminal 400 may be implemented as a terminal capable of accessing a server or a terminal at a remote location through a network. The at least one purchaser terminal 400 is a mobile communication device in which portability and mobility are guaranteed, and examples thereof may include all types of handheld-based wireless communication devices such as a PCS, GSM, a PDC, a PHS, a PDA, IMT-2000, CDMA-2000, W-CDMA, a WiBro terminal, a smart phone, a smart pad, a tablet PC, and the like.

The at least one certified authority server 500 may be a server, such as a national institution and a product production institution, that confirms whether a product is genuine using a web page, an app pages, a program, or an application related to a real asset authentication service using a DID and NFT. The certified authority server 500 may be a server that inspects and verifies a product, confirms whether the product is genuine, and transmits the confirmed product to the authentication management company server 600.

Here, the at least one certified authority server 500 may be implemented as a computer capable of accessing a server or a terminal at a remote location through a network. Here, the computer may include, for example, navigation, a notebook equipped with a web browser, a desktop, a laptop, and the like. In this case, the at least one certified authority server 500 may be implemented as a terminal capable of accessing a server or a terminal at a remote location through a network. The at least one certified authority server 500 is a mobile communication device in which portability and mobility are guaranteed, and examples thereof may include all types of handheld-based wireless communication devices such as a PCS, GSM, a PDC, a PHS, a PDA, IMT-2000, CDMA-2000, W-CDMA, a WiBro terminal, a smart phone, a smart pad, a tablet PC, and the like.

The authentication management company server 600 may be a server that uses a web page, an app page, a program, or an application related to a real asset authentication service using a DID and NFT to store a surface fingerprint, product information, a product image, a unique identification code (serial number), etc., so that authentication information is packed in the NFT and issue the NFT. The issued NFT may be transmitted to the user terminal 100 via the authentication service providing server 300.

Here, the authentication service providing server 600 may be implemented as a computer capable of accessing a remote server or terminal through a network. Here, the computer may include, for example, navigation, a notebook equipped with a web browser, a desktop, a laptop, and the like. In this case, the authentication service providing server 600 may be implemented as a terminal capable of accessing a remote server or terminal through a network. The authentication management company server 600 is a mobile communication device in which portability and mobility are guaranteed, and examples thereof may include all types of handheld-based wireless communication devices such as a PCS, GSM, a PDC, a PHS, a PDA, IMT-2000, CDMA-2000, W-CDMA, a WiBro terminal, a smart phone, a smart pad, a tablet PC, and the like.

Figure 2:
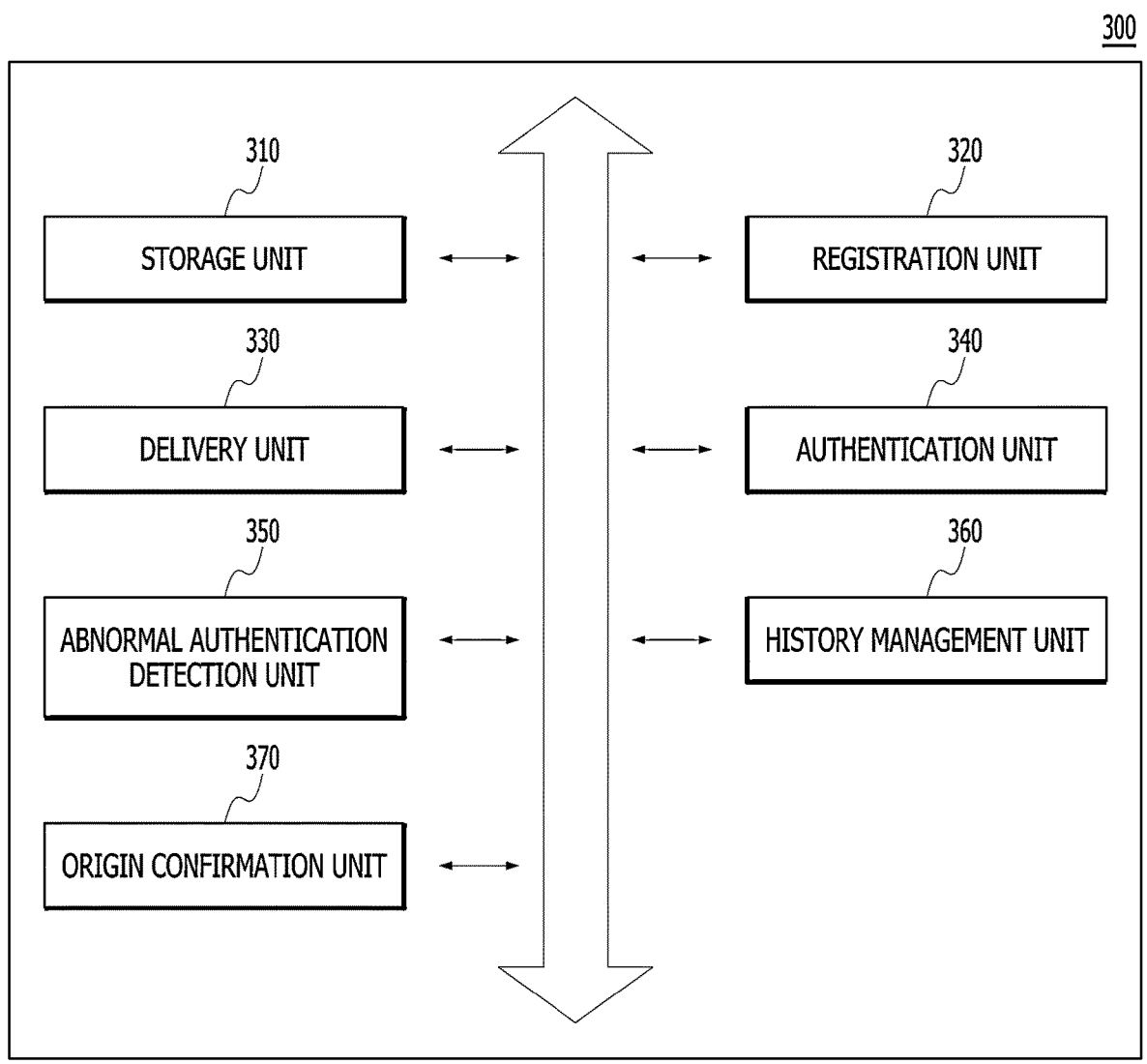
FIG. 2 is a block configuration diagram illustrating an authentication service providing server included in the system of FIG. 1.

FIG. 2 is a block configuration diagram illustrating an authentication service providing server included in the system of FIG. 1, and FIGS. 3, 4 and 5 are diagrams for describing an embodiment in which the real asset original authentication service using the DID and NFT according to the embodiment of the present invention is implemented.

Referring to FIG. 2, the authentication service providing server 300 may include a storage unit 310, a registration unit 320, a delivery unit 330, an authentication unit 340, an abnormal authentication detection unit 350, a history management unit 360, and an origin confirmation unit 370.

When the authentication service providing server 300 according to an embodiment of the present invention or other servers (not illustrated) that operate in conjunction therewith transmit an application, program, app page, web page, etc., related to a real asset authentication service using a DID and NFT to at least one user terminal 100, at least one purchaser terminal 400, at least one certified authority 500, and at least one authentication management company server 600, the at least one user terminal 100, at least one purchaser terminal 400, at least one certified authority 500, and at least one authentication management company server 600 may install or open the application, the program, the app page, the web page, etc., related to the real asset authentication service using the DID and NFT. In addition, by using a script executed in a web browser, the service program may be driven in the at least one user terminal 100, at least one purchaser terminal 400, at least one certified authority server 500, and at least one authentication management company server 600. Here, the web browser is a program that enables the use of World Wide Web (WWW) services, and refers to a program that receives and displays hypertext written in Hyper Text Mark-up Language (HTML), and includes, for example, Netscape, Explorer, Chrome, and the like. In addition, the application refers to an application on a terminal, and includes, for example, an app executed in a mobile terminal (smartphone).

Referring to FIG. 2, the storage unit 310 may store, in an authentication information database, authentication information including a unique identification code of a product and a surface fingerprint according to surface characteristics of the product based on genuine information confirmed by at least one certified authority server 500 when authenticity of the product, which is a real asset, is determined. In the present invention, the "real asset" corresponds to all real assets including general real things and an image of a real thing and/or an immaterial object. In addition, the "surface fingerprint" may be unique surface characteristics of a real thing itself, a surface fingerprint of a general real thing may be unique surface characteristics on a surface of the real thing, and the surface fingerprint of the image of a real thing may be a mark of an artificially generated unique fingerprint pattern. The authentication information may further include product information, a product image, a warranty, and certification authority information of a product. In the case where authenticity of a product, which is a real asset, is received from at least one certified authority server 500, when authentication information including a unique identification code of the product and a surface fingerprint according to surface characteristics of the product is stored in the authentication information database based on genuine information, the storage unit 310 may request generation of authentication information to be packed in an NFT and request issuance of the NFT by transmitting the genuine information to the authentication management company server upon receiving the genuine information from at least one certified authority server 500 to issue a surface fingerprint tag. In this case, the surface fingerprint may be a digitized surface fingerprint processed by magnifying all or some of the physical characteristics of the product image of the product, which is disclosed in detail in the previously registered patent of the present applicant, Korean Patent Registration No. 10-2120051 (published on Jun. 17, 2020), and therefore, a detailed description thereof will be omitted.

<Genuine Product-Counterfeit Determination>

Initially, experts of a certified authority distinguish each product, but when data of these experts accumulates and the amount of accumulated data becomes large enough to build a learning dataset, a labeled dataset that may distinguish which products are genuine and which products are counterfeit data sets may be built. When an artificial intelligence algorithm is modeled after learning, employees of the certified authority only need to check or inspect the case of errors. Human intervention is minimized.

To this end, a measure for determining the input image as a genuine product or a counterfeit with reference to an original image may be defined as follows. The first comparative measure is a mean absolute difference (MAD), and is an expression which measures the mean absolute difference measured by comparing the input image with the original image stored in the authentication service providing server 300. After moving the original image by m and n sizes in horizontal and vertical directions, a difference value between each color component of the input image and the original image is obtained, and an absolute value average thereof is obtained. That is, it may be measured by the following Expressions 1 and 2.

[Expression 1]
$$E(m, n) = \frac{1}{N \times N} \sum_{i=1}^{N} \sum_{j=1}^{N} (|R_{IN}(i, j) - R_{ORG}(i-m, j-n)| + |G_{IN}(i, j) - G_{ORG}(i-m, j-n)| + |B_{IN}(i, j) - B_{ORG}(i-m, j-n)|$$

[Expression 2]
$$MAD = \underset{m, n}{\text{MIN}} E(m, n)$$

The second comparative measure is self similarity (SSIM). This is a method of measuring SSIM based on statistical characteristics of each color component of an input image. Often, it is used as a numerical value that may objectively evaluate the quality of an image. For SSIM measurement, mean, variance, and covariance values of the image are used. The SSIM has a value between 0 and 1 and has a value closer to 1 the closer it is to the original. μIN and μORG denote average brightness of the input image and the original image, respectively. μIN and μORG denote a standard deviation of the input image and the original image, μINORG denotes a covariance therebetween, and c1 and c2 denote correction factors.

[Expression 3]
$$SSIM = \frac{(2\mu_{IN}\mu_{ORG} + c_1)(2\sigma_{INORG} + c_2)}{(\mu_{IN}^2 + \mu_{ORG}^2 + c_1)(\sigma_{IN}^2 + \sigma_{ORG}^2 + c_2)}$$

The third comparative measure is the number of large error pixels. As shown in Expression 4, the number of large error pixels is a value obtained by measuring the number in the case where the error with respect to each color component between the input image and the original image exceeds a certain size α.

$$|R_{IN}(i,j) - R_{ORG}(i-m_1, j-n_1)| + |G_{IN}(i,j) - G_{ORG}(i-m_1, j-n_1)| + |B_{IN}(i,j) - B_{ORG}(i-m_1, j-n_1)| > \alpha$$
[Expression 4]

The fourth comparative measure is the number of edge pixels. The number of edge pixels with respect to the input image is investigated using Cany Edge. This is used for detecting motion blur when capturing an image mounted on a mobile phone. Distortion by the camera, such as blur, causes distortion due to overall quality degradation in which the input image cannot be determined to be genuine or fake.

The fifth comparative measure is a measurement of an M2 value. A second moment is used as a statistical characteristic of an image, and is measured as in Expression 5.

[Expression 5]
$$M_2 = \sum_{m=0}^{256} m^2 H(m)$$

A method of identifying a print using the comparative measure described above will be described below. First, the method includes an image pre-processing process of recognizing some or all of captured images using the camera of the certified authority server 500 and cutting and converting the recognized captured images to a resolution of a certain size. In the process of capturing the image for the input image that has entered the first identification operation, it is confirmed whether there is distortion due to noise such as blur caused by movement, and when it is determined that the image is distorted, a re-photograph message is transmitted to a user. When there is no blur image due to movement, histogram registration is performed based on the original image stored in the authentication service providing server 300. Then, by using the obtained image, an optimal mean absolute difference value with an original image is found. Here, when a product is determined as a genuine product or a counterfeit through primary discrimination using the obtained optimal mean absolute difference, according to the determination result, a discrimination message is transmitted to an employee in a certified authority.

Next, the image not discriminated in the primary discrimination is subjected to secondary identification. After obtaining a score of the MAD for the unrecognized image, a score is given using the number of large error pixels and the SSIM value. The distance between the normalized large error pixel value of the photographed genuine product or counterfeit, the SSIM value, and the normalized large error pixel number of the undetermined image, and a center coordinate with the SSIM value as (x,y) coordinates are obtained. Depending on the distance from the center coordinates, scores are given differently from −5 to 5. By using the score obtained using the MAD, the number of pixels with large errors, and the SSIM, if the score is 4 or more and the "genuine" message is −4 or less, when the "fake" message has a value between −4 and 4, the re-photograph message may be transmitted to the employee of the certified authority. Of course, it is also possible to use a manual method of confirming, by each employee, whether a product is genuine without using the above-described automated method.

The registration unit 320 may pack the authentication information stored in the authentication information database in the NFT and then register the NFT authentication information in the block chain. When the registration unit 320 can pack the authentication information stored in the authentication information database in the NFT and then register the NFT authentication information in the block chain, the registration unit 320 may register the NFT, including a public key in the block chain. In this case, a consensus algorithm used for the NFT usually uses proof of authority (PoA). A PoA algorithm increases a value of node authority to allow any trusted entity to reach a consensus. In this case, the PoA has a fast system expansion and processing speed because consensus is carried out by a verifier of a limited block, but has a disadvantage that influences by threats from outsiders may be applied because the verifier is open to anyone. Accordingly, in one embodiment of the present invention, a consensus algorithm in which an encryption process for identity of a verifier is added may be used as a method of maintaining transaction safety even in frequent transactions during real asset transactions through an NFT and protecting information of a transaction requester. For example, when the consensus algorithm is transmitted to a node after processing in a client, in a general consensus algorithm, when it has gone through a process of [response-proof-header (node)], a process of [response-proof-re-proof-header (node)] may be performed.

<NFT>

The NFT may also be based on hyperledger composer and hyperledger fabric. NFTracer is a proof-of-concept of NFT tracking based on a block chain. NFTracer may be used to build a decentralized artwork auction and a real estate auction that solve the problems of a centralized system. During a transfer of ownership of art, it is implemented as a token to confirm authenticity according to a cryptographic signature and a timestamp, and the transaction thereof is processed as a smart contract. Art registrations and art transactions may be uploaded to Ethereum, and the remaining data may be uploaded to Swarm, which is off-chain p2p data storage. However, Ethereum is not user-friendly as it implements cryptocurrency wallets through complex public and private keys. In an embodiment of the present invention, the above-described Ethereum may be used, but furthermore, Klaytn developed to use an email address or personal ID for users unfamiliar with such a system may be used. In addition, it is possible to automatically find images that violate copyrights by attempting the convergence of a block chain and deep learning to solve problems of intellectual property rights such as copyrights, trademarks, patents, and design rights of an NFT.

<Deep Learning>

An image copy detection system based on a convolutional neural network (CNN) model has already been developed, which also detects duplicate images by rotation, scaling, and other content manipulations. To obtain the extended digital image data set, the images are first converted into 44 different formats, including the original image, during image preprocessing. Then, based on Inception V3, the image copy detection model is trained by automatically extracting shape values of each image. Inception V3 shows better results in training time and accuracy than ResNet_v2, MobileNet_v2, and NASNet large. However, this model has a drawback in that it may not detect images that have been deformed by the Crayon Effect. Accordingly, in the method according to the embodiment of the present invention, a method of improving the detection performance of a CNN with respect to the Crayon Effect, such as modifying training data, may be used.

<Deep Learning on NFT-Based Real Asset Transaction>

In addition to the method of verifying that a product is genuine in the certified authority server 500 described above, it is possible to first analyze similarity with a genuine product image for a real asset using deep learning, and the similarity analysis may use a deep learning CNN model. By issuing NFTs for products that are real assets that have passed the similarity test, products that are certified with the NFT may be transacted.

<Image Similarity Analysis Model Using Deep Learning>

To build a deep learning model for detecting similar designs, the VGG-16 model and AlexNet model, which are modified from CNN models, may be used to extract features of images and analyze similarity. By referring to the image analysis model, it is possible to build a model that detects features of an image that is transformed from a CNN and a fully convolution network (FCN) model. The similarity of each piece of image feature information in the built CNN model is analyzed. In order to quantify the similarity of the image feature information, a Spearman correlation coefficient may be used. After training the built CNN model with a training set (training dataset), various techniques may be applied in the direction of increasing accuracy.

<Block Chain-Based NFT Transaction>

When the user of the user terminal 100 wants to sell his or her product, he/she requests issuance of the NFT. The user terminal 100 creates a smart contract containing contents related to its own NFT transaction. In this case, the smart contract may be changed without limit according to sales conditions of a user and does not include security information such as identity information or an account password. After that, the created smart contract is distributed on a block chain network. Virtual assets are transmitted through smart contracts and ownership of NFTs may be transacted. When a purchaser wants an NFT transaction, the transaction progresses through the smart contract distributed on the block chain. When the transaction conditions, which are the contents of the smart contract, are met, the contract is automatically concluded, so the virtual assets of the block chain are transmitted and the user's NFT is transmitted to the purchaser. After creating the smart contract, the smart contract may be distributed on the block chain network to confirm whether the NFT transaction progresses smoothly. In this case, the above-described NFTracer system may be applied, and the NFTracer may improve transparency by providing an immutable record of ownership.

In this case, when purchasing a product, which is a real asset, the connection with the NFT is possible with the above-described process of the present invention. When the actual product is lost or passed on to another person, the previous record may be immediately applied to the block chain through history management, which will be described later. An Ethereum-based ownership transaction decentralized app (dApp) may be implemented. When the user terminal 100 is a user who uses an application for the first time, the user needs to sign up for membership. Thereafter, the user may use the application by logging in. A purchaser of the purchaser terminal 400 may also sign up for membership through the same process, and view a product certified with the uploaded NFT by interest ranking, price ranking, and category. In addition, when it is possible to determine whether a user's product is genuine through a similarity test, it is possible to register authentication information for the product by issuing an NFT.

<Deep Learning Modeling>

For data collection, data may be collected by web crawling images of websites that provide photos for free without copyright. About 70% of the collected images is a training set and the remaining 30% thereof is used as a test set. To create a similar image analysis index based on the collected images, it is possible to create an image by giving variables such as rotation and color change of an original image. In this case, for example, it is assumed that an NFT is issued using a KIP-17 token provided by a Kakao Klaytn platform. The smart contract for the NFT transaction may be implemented through the Solidity language, and the created contract may be tested and distributed using a browser-based compiler provided by Kakao Klaytn.

By uploading the product photos to be certified with the NFT to the database, it is possible to test the product registration and transaction for actually photographed photos through the completed application. By analyzing the similarity between a product to be registered with an NFT and a photo already registered as a genuine, it is determined whether the photo is a photo obtained by photographing a counterfeit. For photos determined to be similar, the NFT issuance may be blocked, and the KIP-17 tokens may be issued for photos that have passed the test. The NFT transaction test may be progressed by creating a Klaytn account through the Baobab Klaytn Wallet. The paid Klay is transmitted to the Klaytn account through a test net and Faucet that randomly provide the Klay. Traders who want the ownership of the NFT access the NFT through the smart contract, and when the transaction succeeds, the test is considered successful.

An embodiment of the present invention provides a platform for registering and transacting products based on the NFT after analyzing similarity using the deep learning to block the risk of registering an NFT for a counterfeit or a forgery. The image similarity analysis model may be built using the deep learning CNN model, and the NFT may be implemented through the Klaytn platform provided by Kakao, but the platform is not limited to that of Kakao Corp.

The delivery unit 330 may transmit the NFT to the user terminal 100 of the user who is the owner of the product, upload the NFT from the user terminal 100 to the NFT transaction platform, compare the NFT uploaded by the user terminal 100 with the NFT registered in the block chain in the purchaser terminal 400 that wants to purchase the NFT, and then, transmit the comparison result to the purchaser terminal 400. The NFT transaction platform may be an online shopping mall supporting NFT authentication.

When the purchaser terminal 400 receives the product, which is the real asset certified with the NFT, the authentication unit 340 may allow the surface fingerprint of the product to be photographed, and may authenticate that the product is an original when the surface fingerprint packed in the NFT registered in the block chain matches the surface fingerprint photographed by the purchaser terminal 400. In the case where the purchaser terminal 400 receives the product, which is the real asset certified with the NFT, when the authentication unit 340 allows the surface fingerprint of the product to be photographed, and authenticates that the product is an original when the surface fingerprint packed in the NFT registered in the block chain matches the surface fingerprint photographed by the purchaser terminal 400, it is possible to confirm whether the photographing device is connected to the purchaser terminal 400, adjust the magnification of the photographing device to a preset magnification, and receive the surface fingerprint photographed by the magnification-adjusted photographing device.

In this case, the authentication information may include a physical arrangement relationship between a sculpture image and authentication points for two or more authentication points, for example, a distance, an angle, a ratio, and the like in addition to the above-described information, include, as basic information for a surface of a product, for example, a product name, a date of manufacture, a manufacturer, a country of manufacture, a warranty period, a product size, an ingredient or material of a product, external characteristic information of a product such as color, size, and morphological characteristics, and include a subject who generates authentication information for a product, a uniform resource identifier (URI) capable of confirming information on the product or a service access address for original authentication, a QR code including physical characteristic information, the entire image or at least a portion of an image for an authentication area, a digitized surface fingerprint image showing the authentication area, the authentication points, and the physical arrangement relationship in one picture, and at least one of a certificate or a warranty including information for authentication.

In this case, the physical characteristic information may include the surface fingerprint of the product, the surface fingerprint of the product may be an irregular pattern that is generated due to the characteristics of the product production process or is naturally formed on the surface of the ingredient or material of the product and may be at least one piece of information selected from a comb pattern, a blister pattern, a crater pattern, a net pattern, a corrugated pattern, a nonwoven pattern, a sandpaper pattern, a stripe pattern, a cloud pattern, a wavy pattern, a sand pattern, a whirlwind pattern, a bead pattern, and a block-type patterns that are identified in an image of actual size or image that magnified by more than 1× using image realization technologies such as planes, 3D, holograms, and X-rays. This is an image of an authentication area or an image of sculpture areas for an authentication point, and the surface fingerprint may be included in the original authentication information.

<DID>

<DID> Most DIDs authenticate a user by methods such as biometric data, a password, and a pattern, and in one embodiment of the present invention, set patterns uniquely engraved on each product as a fingerprint, generate a fingerprint tag, and allow each product to be authenticated under the concept of authentication using the DID method. Hereinafter, when a characteristic pattern appearing on the surface is referred to as a surface fingerprint, the surface fingerprint will be described as a biometric authentication target. In this case, since an authentication method of Fast IDentity Online (FIDO), which is a biometric authentication standard, uses the same PKI method as a public certificate, identity verification, integrity, confidentiality, and non-repudiation are possible. In this case, the FIDO universal authentication framework (FIDO UAF) may be used for authentication through user-specific biometric information recognition such as fingerprint, voice, and face recognition. When the biometric information is recognized through the device, a server may be accessed, and then, a security key provided or stored by the device is input in order.

An FIDO universal second factor (FIDO U2F) supports a two-stage online authentication method. The FIDO U2F authentication method may enhance security by adding a separate authentication method to the existing encryption infrastructure. A user logs in using a name and a password as in the past method, and is authenticated using the FIDO security key and a second factor device (e.g., USB dongle key, smart card, etc.). By using a second authentication factor with enhanced security, the existing difficult password system may be simplified to 4 digits without affecting security. The authentication data generated in this way makes it possible to use the block chain-based DID platform. Components for self-sovereign identity management include the DID and a DID document used as identifiers and authentication means, verifiable credential (VC) used as ID for storage, and verifiable presentation (VP) used as ID for submission. In addition, the distribution of important large-capacity documents has a configuration that ensures integrity through the verified DID hub for transmission.

The main participants for identity authentication are an issuer who issues the VC, a holder who receives the issued VC and then processes the VC into VP and submits the VP to a verification agency, a verifier that receives the VP from a user and verifies the authenticity of the VP, and an identifier registry that is a distributed repository storing the DID and ID-related information. The DID infrastructure for the self-sovereign identity management is implemented on a DID-compatible block chain, a distributed ledger, or a distributed network data platform. The collected data is managed by being transformed into the DID using a public key, an authentication protocol, and a service endpoint data set required for encrypted entity interaction. In the case of the DID, the institution itself handles the integrity guarantee and authenticity determination of data through the public key shared by related institutions connected to the distributed network. In this process, the integrity of the identity ID and the large data processing and authentication process may be guaranteed using the consensus algorithm.

Alternatively, two-factor authentication and multi-factor authentication are possible. The two-factor authentication and the multi-factor authentication are a method of authentication using the factors a user knows and the factors the user has. To access a service, a user needs to have both elements. When authentication is performed in the request-response process, the authentication is completed when there is personal information required by a system that may authenticate a user. With one-factor authentication, elements that a user knows, such as ID and password, are used, and with two-factor authentication, elements that a user has, such as an SMS, OTP, or security card may be used to use user authentication. Even if one-factor password is exposed through an insecure channel, it is safe from a technical point of view because the two-factor authentication may not be solved unless a user loses the elements possessed by the user.

For biometric authentication, it is possible to compare a hash value with a hash value generated based on information received from the user by finding a block in which biometric information is stored in the block chain. When the hash values are the same, the authentication is completed. In order to measure the user's biometric information, an iris, a fingerprint, or the like is collected using a smart phone, so the contents of the user's information may not be confirmed through a hash function so that the information may not be known. Even if this information is exposed, the information may not be verified due to the hash function, and it is a technique that guarantees anonymity so that only the server may identify the information.

Using the above two techniques, the multi-factor authentication platform may be implemented. That is, the ID and password are first basic authentication items, the ARS is a second authentication item, and the third authentication item may be Face ID or biometric recognition using a fingerprint. However, it will be obvious that the order may be changed. In other words, whenever a user changes or encrypts a file, if the user enters an ID or a password one by one and receives an ARS call to perform authentication, a user has to continuously perform repeated authentication for ransomware, in which case it can never be known when it arrives. Possible items, for example, voice authentication, face recognition, etc., may first be performed without taking any action.

The multi-factor authentication is an authentication method using attributes that a user already has. In the user's response process to the system request, the authentication is completed when a user can prove that the user is correct through authentication. As the authentication progresses by stages, it may be used in services that require security stability. After being authenticated, the latest authentication data is loaded and included in chain data. When the authentication is performed again in the future, the final authentication progresses after comparing the chain data with the recent authentication data, and the service may be performed after the latest authentication data is loaded back into the chain data.

The abnormal authentication detection unit 350 may allow the surface fingerprint of the product to be photographed when the authentication unit 340 receives a product, which is a real asset certified with the NFT, from the purchaser terminal 400, authenticate that the product is an original when the packed surface fingerprint packed in the NFT registered in the block chain matches the surface fingerprint photographed by the purchaser terminal 400, and then, transmit the abnormal authentication detection event to the purchaser terminal 400 when the authentication request matching preset abnormal authentication data for the product purchased, received, and authenticated by the purchaser terminal 400 occurs. For example, user A sold product C to purchaser B. When authentication of product C occurs at 11 am on Nov. 1, 2021 in Yeoksam-dong, Gangnam-gu, which is a delivery address of purchaser B, and again at 11:30 am on Nov. 1, 2021 in Saha-gu, Busan, since it is impossible to get from Seoul to Busan in 30 minutes by modern technology, it means that there is someone other than the purchaser B who received the same product, and when a product that is a unique specific thing is no longer specified as a counterfeit, it means that either purchaser B or another purchaser in Busan must possess a counterfeit. Accordingly, it is possible to detect the abnormal genuine product authentication (fraud) using the access environment information, location information, and time information of the purchaser terminal 400.

The history management unit 360 may allow the surface fingerprint of the product to be photographed when the authentication unit 340 receives a product, which is a real asset certified with the NFT, from the purchaser terminal 400, authenticate that the product is an original when the surface fingerprint packed in the NFT registered in the block chain matches the surface fingerprint photographed by the purchaser terminal 400, and then, store and manage a history log leading to the user terminal 100, the purchaser terminal 400, and the counterpart terminal (not illustrated) when the purchaser terminal 400 resells a product. In this case, the history log may be an authentication history.

Before storing, in the authentication information database, the authentication information including the unique identification code of the product and the surface fingerprint according to the surface characteristics of the product based on the genuine information when the storage unit 310 receives a determination of the authenticity of a product, which is a real asset, from at least one certified authority server 500, the origin confirmation unit 370 may collect environmental data including an origin, a location, temperature, and humidity collected during production, distribution, and sale of the product and logistics data including a movement route, shipment, and arrival and register the collected environmental data and logistics data in the block chain. For example, although products entrusted to OEMs are different, some luxury products insist on domestic production. For example, a case where products are produced in country A and distributed to Korea is a normal import route, but when it is proven that products are imported from country B according to loading information or shipping information, it may be assumed that the products imported from country B are counterfeit unless the products are genuine product parallel imports.

Hereinafter, an example of an operation process according to the configuration of the authentication service providing server of FIG. 2 will be described in detail with reference to FIGS. 3 and 4. However, it will be apparent that the embodiment is only one of various embodiments of the present invention and is not limited thereto.

Figure 3:
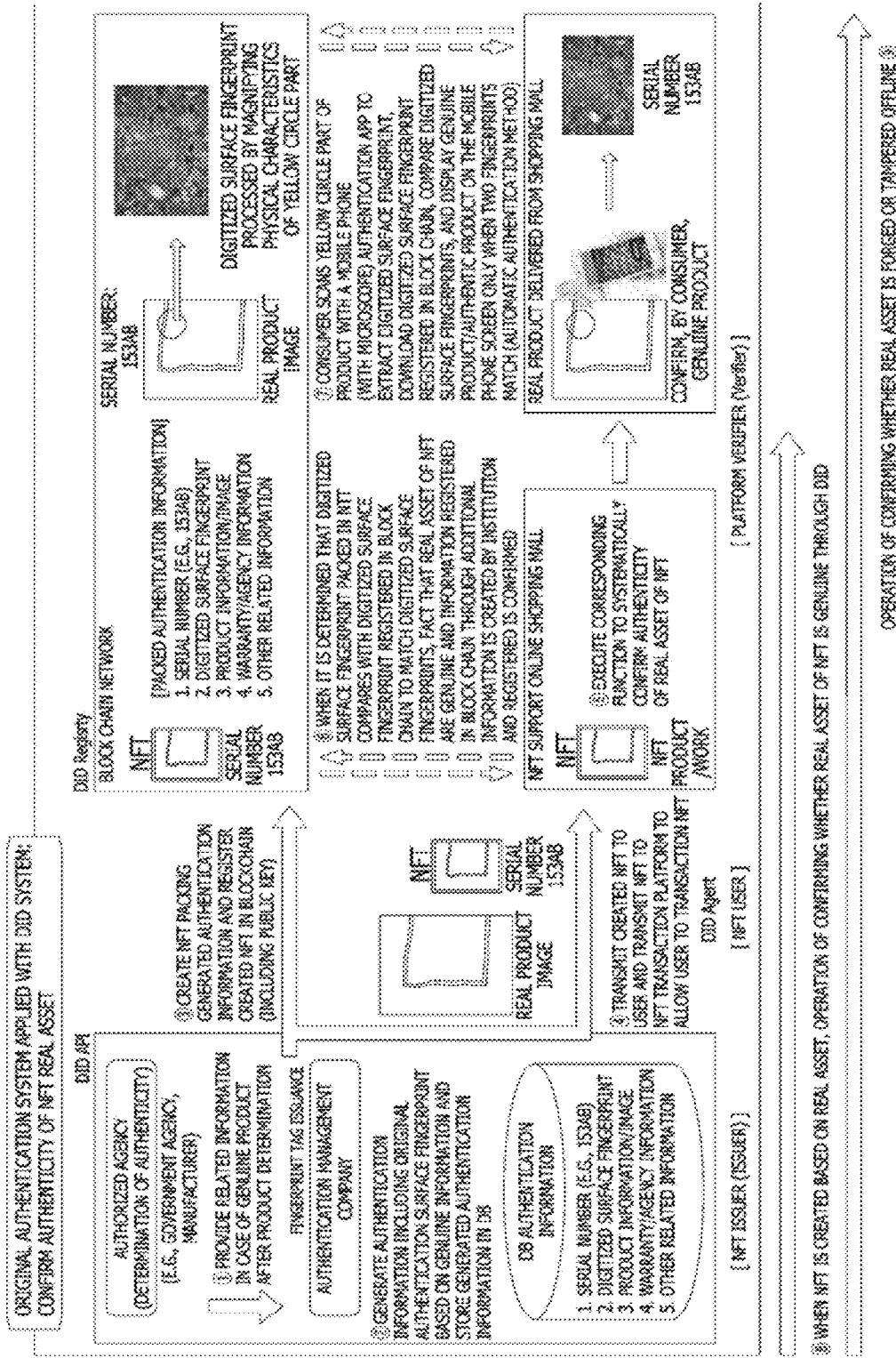
FIGS. 3, 4 and 5 are diagrams for describing an embodiment in which the real asset original authentication service using the DID and NFT according to the embodiment of the present invention is implemented.
Figure 4:
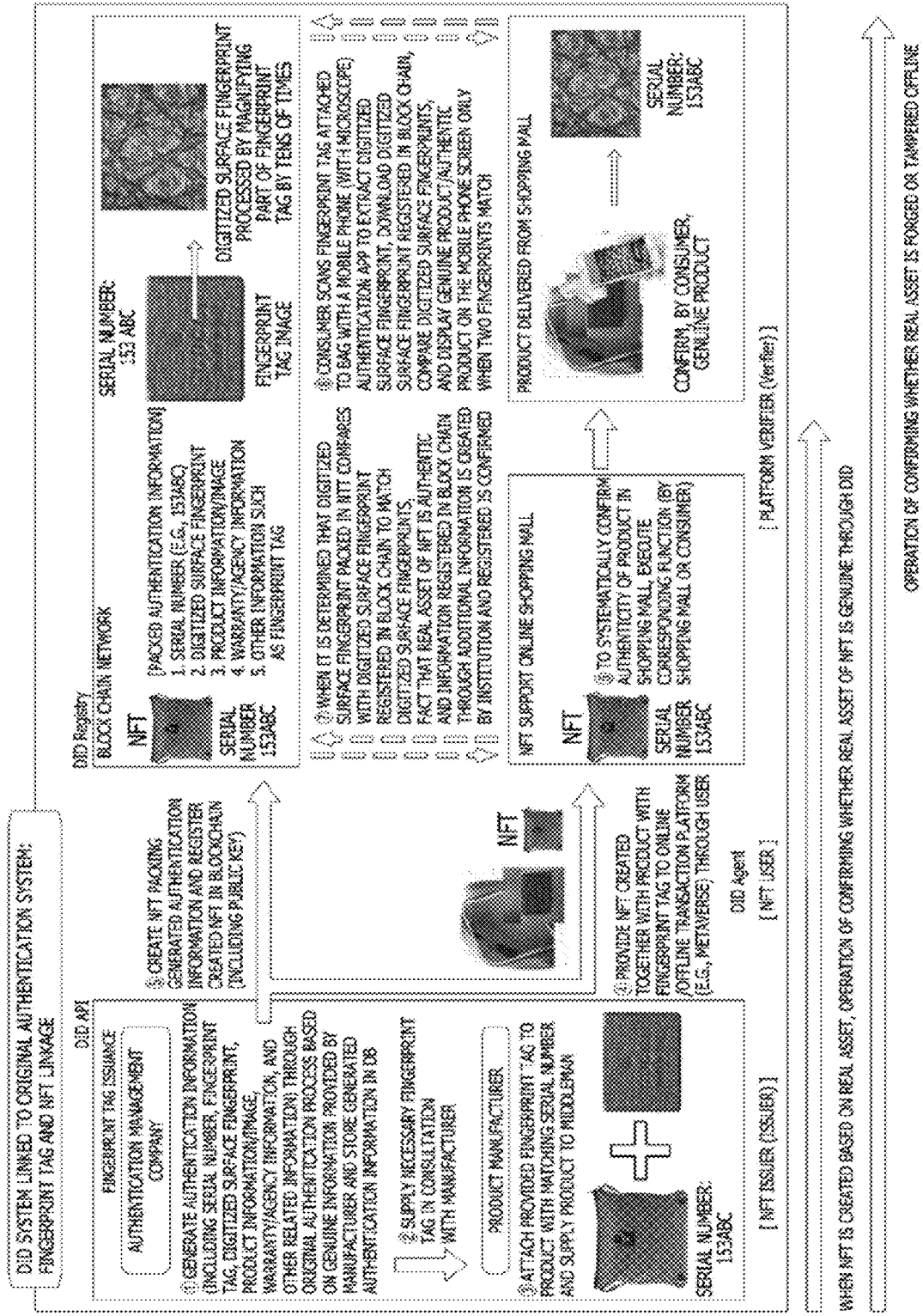
Figure 5:
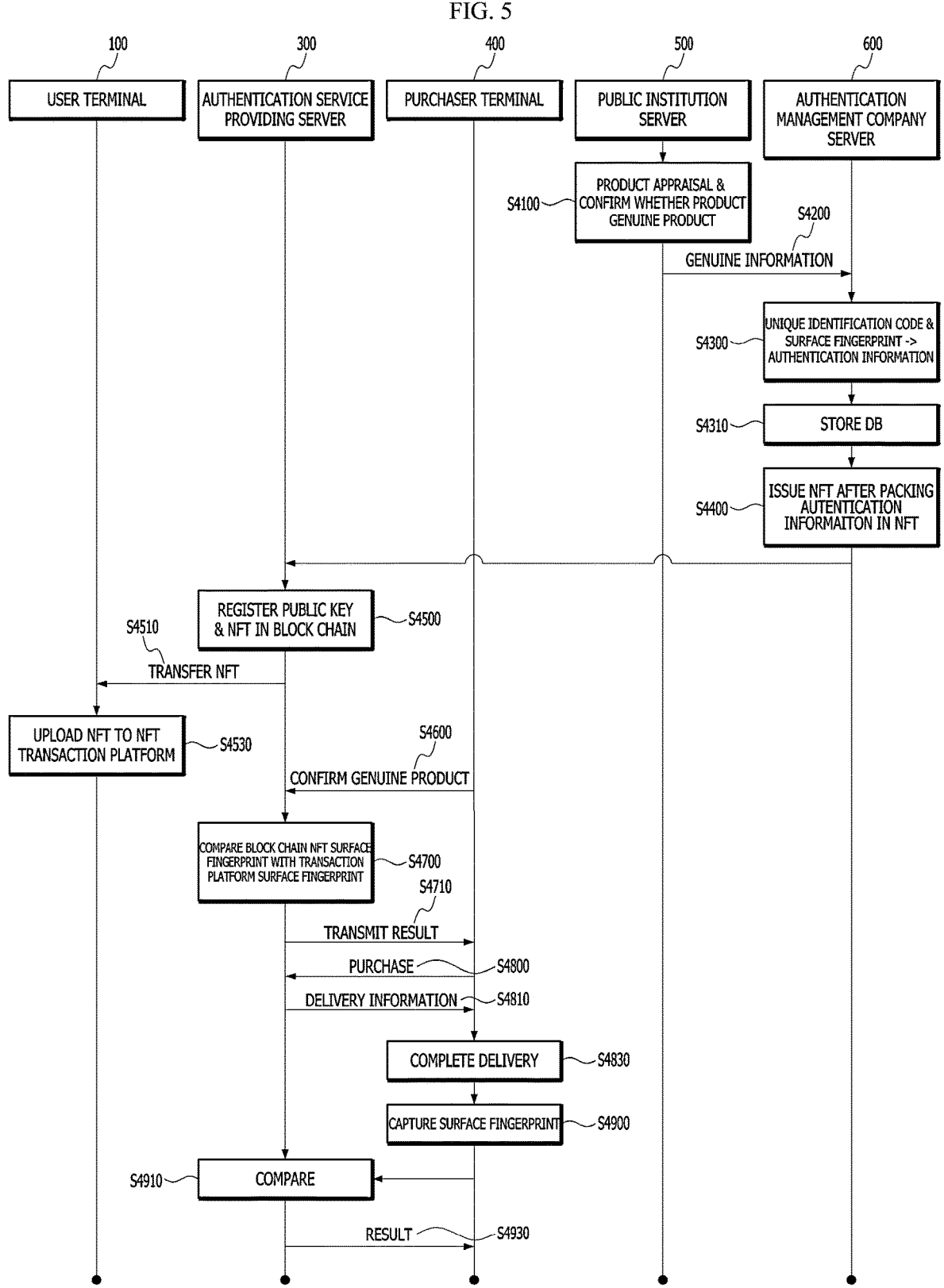

Referring to FIGS. 3, 4, and 5, the public institution server 500 evaluates a product requested for evaluation as to whether a product is genuine (S4100), and transmits the genuine product information to the genuine product authentication management company 600 only when the product is genuine by confirming whether the product is genuine (S4200). In this case, when the product is not a genuine product, that is, is determined as a counterfeit or a fake, the public institution server 500 may help dissipate counterfeits within a market ecosystem by reporting a trademark infringement or violation of the Unfair Competition Prevention Act to a company or a competent authority. In this case, the authentication management company server 600 generates authentication information using a unique identification code and a surface fingerprint (S4300), stores the generated authentication information in the database (S4310), and packs the generated information in the NFT to issue the NFT (S4400). The NFT issued in this way is transmitted to the authentication service providing server 300, and the authentication service providing server 300 registers the NFT in the block chain network along with the public key (S4500), and transmits the NFT to the user terminal 100 (S4510).

When the authentication service providing server 300 provides the NFT transaction platform by itself, the user terminal 100 uploads the product certified with the NFT to the NFT transaction platform (S4530), and when there is the purchaser terminal 400 that sees the uploaded product to confirm whether the product is genuine, the authentication service providing server 300 compares the surface fingerprint in the NFT registered in the block chain with the surface fingerprint in the NFT uploaded in the NFT transaction platform (S4700) and transmits the comparison result to the purchaser terminal 400. In this case, after the purchaser terminal 400 makes a purchase (S4800), the authentication service providing server 300 performs delivery processing (S4810), and when the delivery completion event is output from a delivery driver terminal (not illustrated), the purchaser terminal 400 confirms whether the photographing device is interlocked (S4900) and then performs control to photograph the surface fingerprint (S4900). In this case, when the number of times of enlargement or reduction is stored in the authentication service providing server 300, it is possible to automatically adjust the enlargement times without manipulating the UI in the purchaser terminal 400. As in operation S4700, the surface fingerprint photographed in this way may be output from the purchaser terminal 400 through the surface fingerprint comparison process (S4910) according to whether the product is genuine or not (S4930).

The order between the above-described operations (S4100 to S4930) is merely exemplary and is not limited thereto. That is, the order between the above-described operations (S4100 to S4930) may be mutually changed, and some of these operations may be simultaneously executed or deleted.

As described above, since contents described for the method of providing a real asset authentication service using DID and NFT of FIGS. 2 to 5 are the same as those of the method of providing a real asset authentication service using a DID and NFT described above with reference to FIG. 1 or can be easily inferred from the described content, a detailed description thereof will be omitted.

Figure 6:
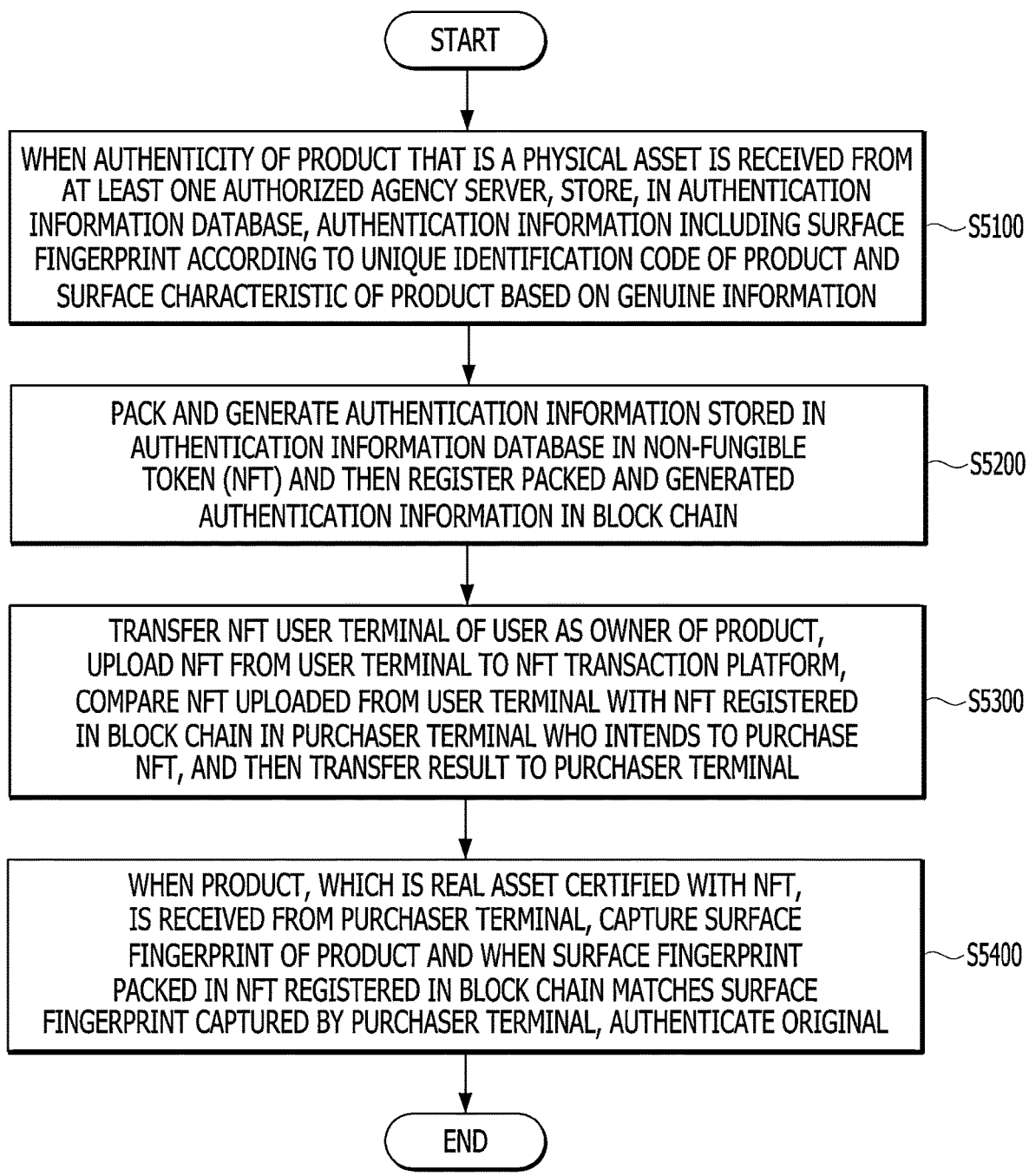
FIG. 6 is a flowchart for describing a method of providing a real asset authentication service using the DID and NFT according to an embodiment of the present invention.

FIG. 6 is a diagram illustrating a process of transmitting/receiving data between respective components included in the system for providing a real asset authentication service using a DID and NFT of FIG. 1 according to the embodiment of the present invention. Hereinafter, an example of the process of transmitting/receiving data between the respective components will be described with reference to FIG. 6, but the present application is not limited to such an embodiment, and it is apparent to those skilled in the art that the process for transmitting and receiving data illustrated in FIG. 6 may be changed according to various embodiments described above.

Referring to FIG. 6, the authentication service providing server may store, in an authentication information database, authentication information including a unique identification code of a product and a surface fingerprint according to surface characteristics of the product based on genuine information confirmed by at least one certified authority server when authenticity of the product, which is a real asset, is determined (S5100).

In addition, the authentication service providing server packs the authentication information stored in the authentication information database in the NFT, and then registers the NFT authentication information in the block chain (S5200), transmits the NFT to the user terminal of the user who is the owner of the product, uploads the NFT from the user terminal to the NFT transaction platform, compares the NFT uploaded from the user terminal with the NFT registered in the block chain in the purchaser terminal who intends to purchase the NFT, and transmits the comparison result to the purchaser terminal (S5300).

In addition, the authentication service providing server allows the purchaser terminal to photograph the surface fingerprint of the product when the purchaser terminal receives the product, which is the real asset certified by the NFT, and authenticates that the product is original when the surface fingerprint packed in the NFT registered in the block chain matches the surface fingerprint photographed by the purchaser terminal (S5400).

The order between the above-described operations (S5100 to S5400) is merely exemplary and is not limited thereto. That is, the order between the above-described operations (S5100 to S5400) may be mutually changed, and some of these operations may be simultaneously executed or deleted.

As described above, since contents described for the method of providing a real asset authentication service using DID and NFT of FIG. 6 are the same as those of the method of providing a real asset authentication service using DID and NFT described above with reference to FIGS. 1 to 5 or can be easily inferred from the described content, a detailed description thereof will be omitted.

The method of providing a real asset authentication service using a DID and NFT according to the embodiment described with reference to FIG. 6 may be implemented in the form of a recording medium including instructions executable by a computer, such as an application or program module executed by a computer. A computer-readable medium may be any available media that may be accessed by a computer and includes both volatile and nonvolatile media and removable and non-removable media. Also, the computer-readable medium may include all computer storage media. The computer storage medium includes both volatile and nonvolatile and removable and non-removable media implemented in any method or technology for storage of information such as computer readable instructions, data structures, program modules, or other data.

The method of providing a real asset authentication service using a DID and NFT according to the embodiment of the present invention described above may be executed by an application (which may include programs included in a platform, an operating system, or the like basically installed in the terminal) that is basically installed in the terminal, and may be executed by an application (i.e., program) installed directly on a master terminal by a user through an application providing server such as an application store server, an application, or a web server related to the corresponding service. In this sense, the method of providing a real asset authentication service using a DID and NFT according to the embodiment of the present invention described above is implemented as an application (i.e., program) basically installed in a terminal or directly installed by a user, and may be recorded on a computer-readable recording medium of the terminal, or the like.

According to embodiments of the present invention, it is possible to create an NFT by determining that a real asset is genuine from a certified authority, and then, packing authentication data including a unique identification code and a surface fingerprint, which is a physical characteristic on a surface of the real asset, in the NFT when the real asset is transacted with the NFT, display authentication of a genuine product when the surface fingerprint in the NFT is compared with and matches the received physical characteristics of the real asset based on a DID after transaction parties receive the real asset while receiving the NFT in the case where the transaction between the transaction parties is performed through the NFT after the NFT is registered in the block chain, maintain original identity, integrity, and continuity of storage of the real asset, and help maintain the business credit of a seller of a genuine product to contribute to industrial development and protect interests of consumers.

The above description of the present invention is for illustrative purposes, and those skilled in the art to which the present invention pertains will understand that it may be easily modified into other specific forms without changing the technical spirit or essential features of the present invention. Therefore, it is to be understood that the embodiments described above are illustrative rather than being restrictive in all aspects. For example, each component described as a single type may be implemented in a distributed manner, and similarly, components described as distributed may be implemented in a combined form.

It is to be understood that the scope of the present invention will be defined by the claims rather than the above-described description and all modifications and alterations derived from the claims and their equivalents are included in the scope of the present invention.

What is claimed is:

1. A method of providing an authentication service using a decentralized identifier (DID) and a non-fungible token (NFT) executed by an authentication service providing server, the method comprising:
   storing, in an authentication information database, authentication information including a unique identification code of a product and a surface fingerprint according to surface characteristics of the product based on genuine information confirmed by at least one certified authority server for confirming whether the product is genuine when authenticity of the product, which is a real asset, is determined;
   packing the authentication information stored in the authentication information database in an NFT and registering the NFT authentication information in a block chain;
   transmitting the NFT to a user terminal of the user who is the owner of the product; and
   transmitting the NFT from the user terminal to an NFT transaction platform, which is an online shopping mall;
   confirming whether a product, which is a real asset certified with the NFT transmitted from the user terminal, is genuine/authentic, the confirming comprising comparing the NFT transmitted from the user terminal with an NFT whose authenticity is determined by the at least one certified authority server and which is registered in the block chain before transmitting the NFT from the user terminal to the NFT transaction platform;
   transmitting a comparison result to a purchaser terminal as a genuine confirmation result for the product being sold by the user terminal;
   transmitting the NFT to the purchaser terminal when it is confirmed that the product, which is the real asset certified with the NFT, is genuine/authentic through the comparison result, purchasing the product from the purchaser terminal, and transmitting the NFT to the purchaser terminal when the purchase is completed;
   allowing the purchaser terminal to photograph the surface fingerprint of the product when the purchaser terminal purchases and receives the product, which is the real asset certified with the NFT, and authenticating that the product is original when the surface fingerprint packed in the NFT matches the surface fingerprint photographed by the purchaser terminal; and
   when an authentication request matching preset abnormal authentication data occurs for a product purchased, received, and authenticated by the purchaser terminal, transmitting an abnormal authentication detection event to the purchaser terminal,
   wherein the registering comprises, in order to block a risk of NFT registration for a counterfeit or a forgery before packing the authentication information in the NFT and then registering the authentication information in the block chain, conducting a similarity test comprising analyzing similarity between an image of the product corresponding to the authentication information and a genuine image of the product, which is the real asset, using a deep learning convolutional neural network (CNN) model and issuing the NFT for the product only when it is determined that the product corresponding to the authentication information is genuine through the similarity test,
   the preset abnormal authentication data is set using access environment information, location information, and time information of the purchaser terminal as data for detecting occurrence of the abnormal genuine product authentication,
   the transmitting comprises, after a first user sells a first product to a first purchaser, when a certain period of time elapses after authentication of the first product occurs at a first time at a first location which is a delivery address of the first purchaser, and secondarily occurs at a second location, when it is determined that it is impossible to geographically move from the first location to the second location in reality within a time difference in consideration of a movement time difference between the first location and the second location considering a geographic location and a time difference between the first time and the second time, it is detected that the abnormal genuine product authentication occurs and an abnormal authentication detection event is transmitted to the purchaser terminal,
   the storing comprises, determining the authenticity of the product by an automated authenticity determination process using a plurality of comparative measures including a mean absolute difference (MAD), self similarity (SSIM), the number of large error pixels, the number of edge pixels, and an M2 value, which is a statistical characteristic of the image, and a manual authenticity determination process by an employee within a certified authority corresponding to the certified authority server, and
   the automated authenticity determination process is made, after performing an image pre-processing process of recognizing some or all of captured images using a camera of the certified authority server and cutting and converting the recognized captured images to a resolution of a certain size, by a process of confirming whether there is distortion due to noise including blur caused by movement during capturing an image for an input image for primary identification, transmitting a re-photograph message to the certified authority server when it is determined there is a distorted image, performing histogram registration based on an original image stored in the authentication service providing server when it is determined that there is no blur image due to the movement, and using the mean absolute difference measured by comparing an image obtained later with the original image to transmit a message of the determination result to the employee in the certified authority when the product is determined to be genuine or counterfeit through primary discrimination, and a process of performing secondary identification on an image that is not discriminated in the primary discrimination, obtaining a score of the MAD for the non-discriminated image and then giving the score using the number of large error pixels and the SSIM value, obtaining a distance between a normalized large error pixel value of the photographed genuine product or counterfeit, the SSIM value, a normalized large error pixel number of the undetermined image, and a center coordinate with the SSIM value as an (x,y) coordinate, differentially giving a score from −5 to 5 depending on a distance from the center coordinate, using a score obtained using the MAD, the number of large error pixels, and the SSIM to transmit a message indicating that the product is a genuine to the employee of the certified authority when the score is 4 or more, transmit a message to the employee of the certified authority indicating that the product is counterfeit when the score is −4 or less, and transmit a re-photograph message to the employee of the certified authority when the score has a value between more than −4 and less than 4.

2. The method of claim 1, wherein the authentication information further includes product information, a product image, a warranty, and certification authority information of the product.

3. The method of claim 1, wherein the storing of, in the authentication information database, the authentication information including the unique identification code of the product and the surface fingerprint according to the surface characteristics of the product based on the genuine information confirmed by the at least one certified authority server includes requesting generation of the authentication information to be packed in the NFT and requesting issuance of the NFT by transmitting the genuine information to an authentication management company server upon receiving the genuine information from the at least one certified authority server to issue a surface fingerprint tag.

4. The method of claim 1, wherein the packing of the authentication information stored in the authentication information database in the NFT and then registering the NFT authentication information in the block chain includes registering the NFT by including a public key in the block chain.

5. The method of claim 1, wherein the surface fingerprint is a digitized surface fingerprint processed by magnifying physical characteristics of all or some of product images of the product.

6. The method of claim 5, wherein the physical characteristics are at least one piece of information selected from a fingerprint generated naturally on the surface of the product, a fingerprint generated during a production process, and an artificially generated fingerprint.

7. The method of claim 1, wherein the allowing of the purchaser terminal to photograph the surface fingerprint of the product when the purchaser terminal receives the product which is the real asset certified with the NFT, and the authenticating that the product is original when the surface fingerprint packed in the NFT registered in the block chain matches the surface fingerprint photographed by the purchaser terminal includes: checking whether a photographing device is connected to the purchaser terminal; adjusting a magnification of the photographing device to a preset magnification; and receiving the surface fingerprint photographed with the magnification-adjusted photographing device.

8. The method of claim 1, further comprising, after the allowing of the purchaser terminal to photograph the surface fingerprint of the product when the purchaser terminal receives the product which is the real asset certified with the NFT, and the authenticating that the product is original when the surface fingerprint packed in the NFT registered in the block chain matches the surface fingerprint photographed by the purchaser terminal, further storing and managing a history log leading to the user terminal, the purchaser terminal, and a counterpart terminal when the purchaser terminal resells the product.

9. The method of claim 1, wherein, before the storing of, in the authentication information database, the authentication information including the unique identification code of the product and the surface fingerprint according to the surface characteristics of the product based on the genuine information confirmed by the at least one certified authority server further includes collecting environmental data including an origin, a location, temperature, and humidity collected during production, distribution, and sale of the product and logistics data including a movement route, shipment, and arrival and registering the collected environmental data and logistics data in the block chain.

* * * * *